UNITED STATES PATENT OFFICE.

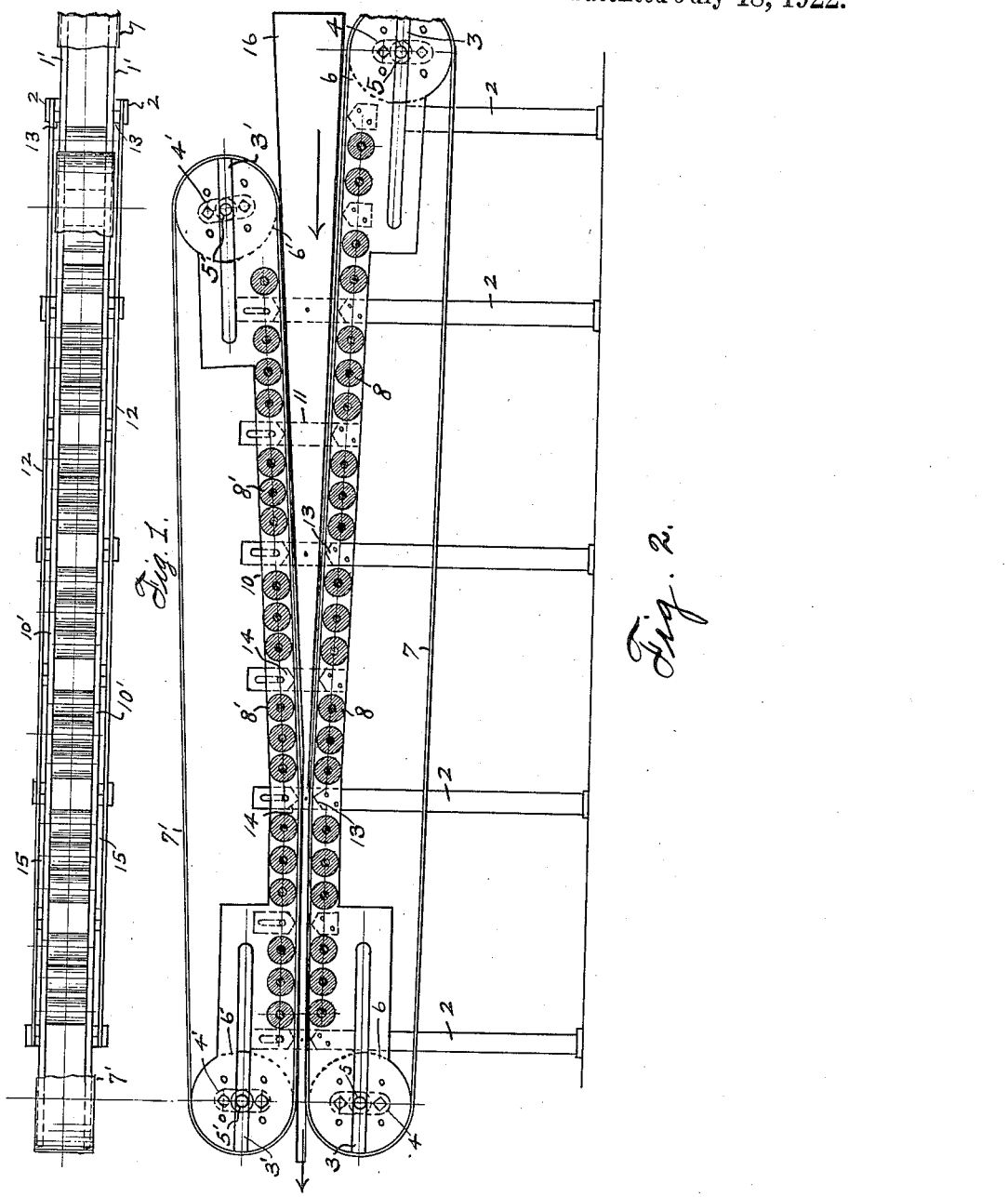

JAMES T. POKORNY, OF CEDAR BAYOU, TEXAS, ASSIGNOR OF ONE-HALF TO A. T. EDDINGSTON, OF PORT ARTHUR, TEXAS.

MOLDING MACHINE.

1,423,020. Specification of Letters Patent. Patented July 18, 1922.

Application filed September 18, 1920. Serial No. 411,130.

*To all whom it may concern:*

Be it known that I, JAMES T. POKORNY, a citizen of the United States, residing at Cedar Bayou, in the county of Harris and State of Texas, have invented a certain new and useful Improvement in a Molding Machine, of which the following is a specification.

This invention relates to new and useful improvements in a molding machine and has particular relation to a machine designed to mold clay, preparatory to the formation of brick therefrom.

One object of the invention is to provide a molding machine of the character described which is formed with endless aprons spaced apart and between which the clay to be molded passes, and by means of which it is formed into a uniform and compact bat which is later cut into the required dimensions before entering the kiln to be burned.

Another object of the invention is to provide a device of the character described whose molding belts may be adjusted towards and from each other to vary the thickness of the bat formed.

A still further feature of the invention resides in a novel construction whereby the waste clay may be discharged from the machine clear of said belts or aprons so as to prevent the clogging of the same thereby.

With the above and other objects in the view the invention has particular relation to certain novel features of construction, operation and arrangement of parts, an example of which is given in this specification and illustrated in the accompanying drawings, wherein:—

Figure 1 shows a plan view of the device shown partially in section, and

Figure 2 shows a vertical sectional view thereof.

Referring now more particularly to the drawings wherein like numerals of reference designate similar parts in each of the figures, the numeral 1 designates the lower or fixed frame-work which is composed of side plates 1', 1' spaced apart. These plates are secured to the upper ends of the supporting legs 2 and their ends are widened and formed with the elongated end slots 3, 3, and fixed to the said ends are the bearings 4, 4 in which the shafts 5, 5 are rotatably mounted. Fixed upon these respective shafts are the rollers 6, 6 over which the endless belt 7 operates.

The bearings 4 are adjustable so that the tension on the belt 7 may be varied as required, and said belt travels over a series of transverse rollers 8 which are fixed upon suitable central shafts, whose ends have bearings in the side plates 1', 1'. The numeral 10 designates the upper frame-work which is formed with the side plates 10', 10' similar in form to the side plates 1' and aligned above them respectively. This upper frame-work is in reversed position with respect to the lower frame-work and has widened ends with the long slots 3', 3', similar to the slots 3, and secured to said ends are the bearings 4', 4' in which the shafts 5' rotate, said shafts 5 and 5' extending through said slots. Mounted upon the shafts 5' are the rollers 6' 6', over which the endless belt 7' operates, and the bearings 4' are adjustable to permit the variation of the tension of the belt 7'. This belt operates over a series of rollers 8', said rollers having central shafts which have end bearings in the side plates 10'. The upper frame-work is supported above the lower frame-work by means of suitable supporting legs 11 which may be secured at their lower ends to the side plates 1', and at their upper ends are adjustably secured to the upper frame-work, as shown in Figure 2. The belts 7 and 7' are wide enough to cover the side plates 1' and 10', and they converge from the feed end toward the discharge end, and for a distance at the discharge end they travel parallel. The clay is fed into the machine passing in the direction indicated by the arrow in Figure 2, and being gradually compressed by said converging belts between the adjacent rollers 8 and 8'. The supporting legs 2 are braced by means of bars 12, 12 which are fastened thereto, one on each side, and extending up on each side of the upper frame-work. These bars are spaced from the sides of the lower framework by means of the space blocks 13, 13.

In order to confine the clay between the belts, I have provided the side boards 16, 16 which are fitted between the edges of the belts between, and alignment with, the respective side plates 1' and 10' on each side, and secured to the corresponding legs 2. These side boards are held spaced slightly from the belts to permit the latter to travel freely, and with the side plates form, in effect, a hopper like chute for the clay.

The space blocks 13 are pointed upwardly, and aligned before them and secured to the plates 10′ are the space blocks 14 reversely arranged to point downwardly, said blocks being in effect wedge-shaped, the free edges of the belts 7 and 7′ passing along the apexes thereof and any clay which, by compression is forced between the belts and the side boards outwardly beyond the edges of the belts is scraped off by said wedge-shaped blocks and falls down through the spaces 15 between the side plates of the respective frame-works and the bars 12, 12 and falls clear of the machine, thus preventing the clogging thereof. When the clay passes from the machine it is of uniform dimension and compact and in condition to be cut into brick of the required dimensions preparatory to their delivery into the kiln for burning.

What I claim is:—

1. A molding machine including a fixed frame-work, an adjustable frame-work arranged above the fixed frame-work, retaining plates secured to and spaced from the fixed frame-work on each side and extending up on each side of the movable frame-work, wedge-shaped space blocks fixed to the side members of the respective frame-works, between them and the retaining plates, endless belts arranged to travel in said respective frame-works between which the material to be moulded passes, the edges of said belts passing along adjacent the apexes of said space blocks and being freed of excess material thereby.

2. A molding machine including a fixed frame-work an adjustable frame-work arranged above the fixed frame-work a common supporting means for said framework, retaining plates secured to and spaced from the fixed frame-work on each side and extending upon each side of the movable frame-work, wedge-shaped space blocks fixed to the side members of the respective frame-works, between them and the retaining plates, endless belts arranged to travel in said respective frame-works between which the material to be moulded passes, the edges of said belts passing along adjacent the apexes of said space blocks and being freed of excess material thereby, and cross rollers in each frame-work which operate to hold the corresponding belts against the material passing between them.

In testimony whereof I have signed my name to this specification in the presence of two subscribing witnesses.

JAMES T. POKORNY.

Witnesses:
E. V. HARDWAY,
LORENA FAHRENTHOLD.